US009516411B2

(12) United States Patent
Shin et al.

(10) Patent No.: US 9,516,411 B2
(45) Date of Patent: Dec. 6, 2016

(54) SIGNAL-SEPARATION SYSTEM USING A DIRECTIONAL MICROPHONE ARRAY AND METHOD FOR PROVIDING SAME

(75) Inventors: Ho joon Shin, Seoul (KR); Se ung Kim, Seoul (KR)

(73) Assignee: MIGHTYWORKS CO., LTD., Seoul (KR)

( * ) Notice: Subject to any disclaimer, the term of this patent is extended or adjusted under 35 U.S.C. 154(b) by 254 days.

(21) Appl. No.: 14/119,982

(22) PCT Filed: May 29, 2012

(86) PCT No.: PCT/KR2012/004213
§ 371 (c)(1), (2), (4) Date: Nov. 25, 2013

(87) PCT Pub. No.: WO2012/161555
PCT Pub. Date: Nov. 29, 2012

(65) Prior Publication Data

US 2014/0126746 A1 May 8, 2014

(30) Foreign Application Priority Data

May 26, 2011 (KR) ........................ 10-2011-0050266

(51) Int. Cl.
*H04B 15/00* (2006.01)
*H04R 3/00* (2006.01)
(Continued)

(52) U.S. Cl.
CPC ............. *H04R 3/005* (2013.01); *G10L 21/028* (2013.01); *G10L 2021/02161* (2013.01)

(58) Field of Classification Search
CPC ..................... H04R 3/005; G10L 2021/02161; G10L 21/028
(Continued)

(56) References Cited

U.S. PATENT DOCUMENTS 8,238,569 B2 8/2012 Jeong et al.
2006/0222184 A1* 10/2006 Buck .................. G10L 21/0208 381/71.1

(Continued)

FOREIGN PATENT DOCUMENTS

| | | |
|---|---|---|
| KR | 1020090037692 | 4/2009 |
| KR | 1020100068188 | 6/2010 |
| WO | 2004053839 | 6/2004 |

OTHER PUBLICATIONS

International Search Report—PCT/KR2012/004213 dated Nov. 28, 2012.

*Primary Examiner* — Paul S Kim
(74) *Attorney, Agent, or Firm* — Knobbe Martens Olson & Bear LLP

(57) ABSTRACT

A signal separation system using directional microphone array and a method for providing same. The signal separation system using directional microphone array includes a signal receiving section which receives a mixed signal in which a first audio signal and a second audio signal are mixed using the directional microphone array, the directional microphone array including at least one first microphone oriented in a first direction and at least one second microphone oriented in a direction different from the first direction, and receives a reference signal through the at least one second microphone. An audio signal separating section cancels the second audio signal from the mixed signal received by the signal receiving section, based on the reference signal inputted through the at least one second microphone.

10 Claims, 12 Drawing Sheets

(51) Int. Cl.
*G10L 21/028* (2013.01)
*G10L 21/0216* (2013.01)

(58) Field of Classification Search
USPC ...................................... 381/94.7, 94.1, 73.1
See application file for complete search history.

(56) References Cited

U.S. PATENT DOCUMENTS

| | | | | |
|---|---|---|---|---|
| 2009/0097670 | A1 * | 4/2009 | Jeong ..................... | H04R 3/005 381/73.1 |
| 2011/0246193 | A1 | 10/2011 | Shin | |

* cited by examiner

SIGNAL-SEPARATION SYSTEM USING A DIRECTIONAL MICROPHONE ARRAY AND METHOD FOR PROVIDING SAME

TECHNICAL FIELD

The present invention relates to a system capable of efficiently separating a desired signal using a microphone array including microphones which face in different directions, preferably, in opposite directions and to a method for providing the same.

BACKGROUND ART

It is desired that most audio-related systems (e.g. a TV, a computer, an audio recognition device, a video camera, or the like) selectively receive desired signals. However, in environments where noise or echo is present, a variety of signals other than the desired signal is produced and is received together with the desired signal by a microphone. A variety of technologies, such as an array of directional microphones, noise reduction, acoustic echo cancel or blind source separation, is being studied in order to remove noise or echo.

An audio-related system receives a mixed signal in which a desired signal is mixed with an undesired signal, such as noise or an echo, through a microphone or microphone array. Therefore, the signal level of the undesired signal contained in the mixed signal causes a problem in the audio-related system in performing a desired operation or an inconvenience to a user.

For instance, when the audio-related system is a system which recognizes an audio command, a problem of lowered audio recognition rate can be created. If the audio-related system is intended to mainly record sound received in a particular direction (e.g. a direction in which pictures are recorded) as in a video camera or a camcorder, undesired sound received in other directions (e.g. a direction from behind) can be sound that a user does not want to record or receive.

Therefore, separating desired sound from undesired sound has a great influence on the performance of audio-related systems and the utility and convenience of the user.

A variety of technologies for separating desired sound from undesired sound is well known. Undesired sound can be sound that is known or unknown to the system. For instance, a published Korean patent application filed by the applicant (or the representative of applicants) (Korean Patent Application No. 10-2009-0111323, "SIGNAL SEPARATION METHOD, AND COMMUNICATION SYSTEM AND AUDIO RECOGNITION SYSTEM USING THE SIGNAL SEPARATION METHOD," hereinafter referred to as "previously filed application") disclosed a technical concept in which the above-described audio-related system effectively separates a known undesired sound from a mixed signal in real time. The disclosure and descriptions of the previously filed application can be incorporated herein by reference.

In addition, irrespective whether or not the undesired sound is known to the audio-related system, a variety of methods for separating the desired sound from the undesired sound contained in the mixed signal (e.g. least mean square (LMS), blind source separation (BSS) or independent component analysis) is also present.

However, most of these conventional methods require a hardware structure to be accurately designed from the point of time when the audio-related system is designed and produced or separate hardware or software resources for using the known undesired sound in the signal separation process. Otherwise, there is another problem in that calculation is too complicated and thus not appropriate for separating the desired signal from the undesired signal in real time.

Therefore, there is required a technical concept with which a desired signal can be separated from a mixed signal simply and efficiently without a change in the hardware structure of the audio-related system or consumption of expensive hardware and/or software resources for signal separation.

DISCLOSURE

Technical Problem

Therefore, the present invention is intended to provide a system that can selectively separate a signal that is received in a particular direction with respect to an audio-related system from a mixed signal using a microphone array which include directional microphones oriented in different directions (e.g. in opposite directions), and a method for providing the same.

Also provided are a system that can be applied simply to an existing audio-related system without requiring the audio-related system to be provided with additional resources, such as a complicated structural change or a piece of hardware, and a method for providing the same.

Technical Solution

In order to overcome the foregoing problem, provided are a signal receiving section which receives a mixed signal in which a first audio signal and a second audio signal are mixed using the directional microphone array, the directional microphone array comprising at least one first microphone oriented in a first direction and at least one second microphone oriented in a direction different from the first direction, and receives a reference signal through the at least one second microphone; and an audio signal separating section which cancels the second audio signal from the mixed signal received by the signal receiving section. The audio signal separating section cancels the second audio signal based on the reference signal inputted through the at least one second microphone.

The mixed signal may be a signal received through the at least one first microphone or a signal in which the signal received through the at least one first microphone and a signal received through the at least one second microphone are mixed.

The directional microphone array may be connected to an audio output system which includes the signal separation system using the directional microphone array and outputs the mixed signal and the reference signal to the signal separation system of the audio output system.

The signal separation system using the directional microphone array may be included in an audio output system, and the second audio signal may be an echo signal produced by inputting an audio signal outputted from the audio output system through the directional microphone array.

The second direction may be opposite to the first direction.

The signal separating section may perform blind source separation (BSS) by setting a first sound source signal corresponding to the first audio signal as a first BSS sound source signal, a second sound source signal corresponding to the second audio signal as a second BSS sound source signal, a signal received through the at least one first microphone as a first BSS input signal, and the reference signal as a second BSS input signal.

The signal separation system using the directional microphone array may be included in an audio storage system, the first audio signal may be a target audio signal that is to be outputted from a first sound source positioned in the first direction with respect to the audio storage system and be stored in the audio storage system, and the second audio signal may be a signal that is to be outputted from a second sound source positioned opposite to the first direction with respect to the audio storage system and be removed from the mixed signal.

The directional microphone array may include at least one first microphone oriented in a first direction and at least one second microphone oriented opposite to the first direction. When a mixed signal in which a first audio signal and a second audio signal are mixed and a reference signal received through the at least one second microphone are outputted through the directional microphone array to the signal separation system, the second audio signal may be canceled from the mixed signal based on the reference signal by the signal separation system.

In order to overcome the foregoing problem, a signal separation system includes: a directional microphone array comprising at least one first microphone oriented in a first direction and at least one second microphone oriented in a direction different from the first direction; a signal receiving section which receives a mixed signal in which a first audio signal and a second audio signal are mixed through the directional microphone array and receives a reference signal through the at least one second microphone; and an audio signal separating section which cancels the second audio signal from the mixed signal received by the signal receiving section. The audio signal separating section cancels the second audio signal based on the reference signal inputted through the at least one second microphone.

In order to overcome the foregoing problem, a method for providing a signal separation system includes the steps of: receiving, at the signal separation system using a directional microphone array which comprises at least one first microphone oriented in a first direction and at least one second microphone oriented in a direction different from the first direction, a mixed signal in which a first audio signal and a second audio signal are mixed through the directional microphone array; receiving, at the signal separation system using the directional microphone array, a reference signal through the at least one second microphone of the microphone array; and canceling, at the signal separation system using the directional microphone array, the second audio signal from the mixed signal. The step of canceling, at the signal separation system using the directional microphone array, the second audio signal from the mixed signal includes canceling the second audio signal based on the reference signal.

The mixed signal may be a signal received through the at least one first microphone or a signal in which the signal received through the at least one first microphone and a signal received through the at least one second microphone are mixed.

The step of canceling, at the signal separation system using the directional microphone array, the second audio signal from the mixed signal to produce an input signal may include performing blind source separation (BSS) by setting a first sound source signal corresponding to the first audio signal as a first BSS sound source signal, a second sound source signal corresponding to the second audio signal as a second BSS sound source signal, a signal received through the at least one first microphone as a first BSS input signal, and the reference signal as a second BSS input signal. The method for providing a signal separation system using a directional microphone array may be recorded as a program and stored in a computer readable recording medium.

Advantageous Effects

There is an effect in that the signal separation system using a directional microphone array according to the present invention can provide a signal separation function simply to an audio-related system which does not have the function of separating a desired signal from a mixed signal using the directional microphone array according to an embodiment of the present invention.

In addition, sound received in a particular direction is easily separated from the mixed signal.

Furthermore, the audio-related system does not require an additional resource where an output signals is stored in order to cancel a known signal (e.g. an echo signal of the output signal produced by the audio-related system) from a received mixed signal. The structure which performs signal separation is not required to be newly provided with a hardware structure which receives the stored output signal or such a hardware structure is not required to be modified.

In addition, since sound received only in a particular direction can be separated from a mixed signal, desired sound received mainly in the particular direction can be put into practice in a simple fashion even if an undesired signal is a new incoming signal unknown to the audio-related system.

DESCRIPTION OF DRAWINGS

A brief description will be made to respective figures for better understanding of the figures which are referred to in the detailed description of the present invention, in which.

BEST MODE

Figure 1A:
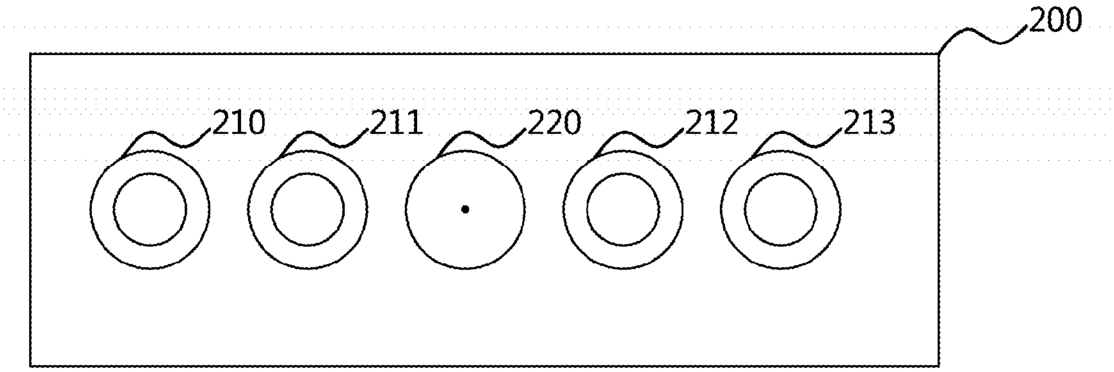
FIG. 1*a* and FIG. 1*b* are views illustrating the concept of a directional microphone array according to an embodiment of the present invention.

The present invention, advantages associated with the operation of the present invention and objects that are realized by the practice of the present invention will be apparent from the accompanying drawings which illustrate exemplary embodiments of the present invention and the detailed description of the present invention which are illustrated in the drawings.

Throughout the specification, it will be understood that, when an element is referred to as "transmitting" data to another element, the element not only can directly transmit the data to another element but also indirectly transmit the data to another element via at least one intervening element.

In contrast, when an element is referred to as "directly transmitting" data to another element, the element can transmit the data to another element without an intervening element.

The present invention will now be described more fully hereinafter with reference to the accompanying drawings, in which exemplary embodiments thereof are shown. Reference should be made to the drawings, in which the same reference numerals are used throughout the different drawings to designate the same or similar components.

Figure 1B:
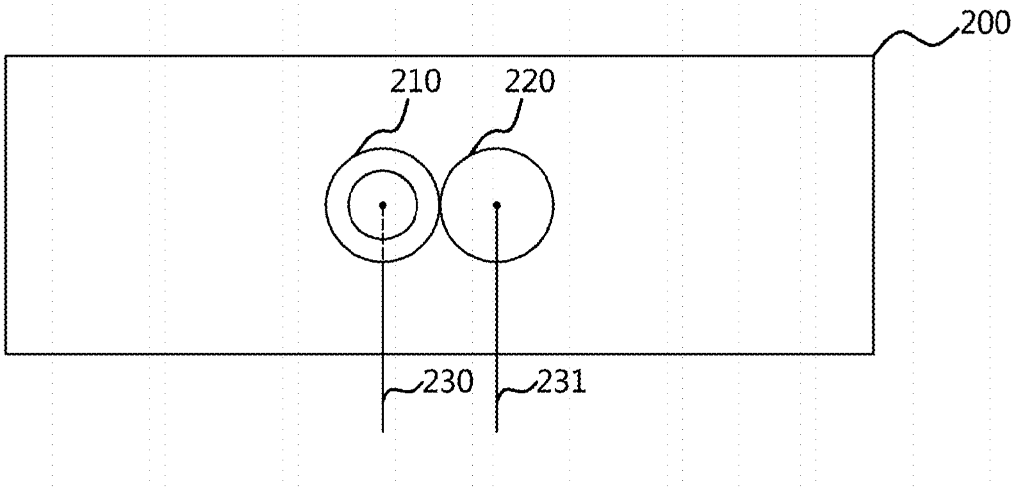

FIG. 1*a* and FIG. 1*b* are views illustrating the concept of a directional microphone array according to an embodiment of the present invention.

First, referring to FIG. 1*a*, a microphone array 200 according to an embodiment of the present invention includes at least one first microphone (e.g. 210, 211, 212 or 213) facing in a first direction. The directional microphone array 200 also includes at least one second microphone (e.g. 220) oriented in a direction different from (e.g. opposite to) the first direction. Although the microphone array 200 is shown in FIG. 1*a* and FIG. 1*b* as including the second microphone (e.g. 220), a plurality of microphones oriented in a direction different from (e.g. opposite to) the first direction can be included. In this case, the second microphone (e.g. 220) can be positioned between a plurality of first microphones (e.g. 210, 211, 212 or 213) or a plurality of second microphones (e.g. 220) can be positioned to be adjacent to each other.

The microphone array 200 can include a housing to which the first microphone (e.g. 210, 211, 212 or 213) and the second microphone (e.g. 220) can be fixed. In addition, the first microphone (e.g. 210, 211, 212 or 213) and the second microphone (e.g. 220) may be disposed adjacent to each other or spaced apart a preset distance from each other. When the first and second microphones are spaced apart, signal delay due to distances is considered to occur in the signal separation process.

Herein, each of the first microphone (e.g. 210, 211, 212 or 213) and the second microphone (e.g. 220) may be implemented as a directional microphone or a cardioid microphone. As is known in the art, the directional microphone may be a microphone that forms a cardioid beam pattern. Therefore, herein, a microphone oriented in a particular direction may be understood that a beam pattern produced by the microphone is directed in the particular direction. The particular direction may indicate a direction (e.g. a forward direction or a rearward direction) that is set based on the vertical surface of the directional microphone array 200. Therefore, a plurality of microphones oriented in the first or second direction may be understood that respective microphones are not oriented toward a common particular point but the respective microphones are oriented in a common direction (e.g. a forward or rearward direction).

The technical concept of the present invention will be described more in conjunction with the case in which the directional microphone array 200 includes one first microphone 210 and one second microphone (220), as shown in FIG. 1*b*.

Figure 3A:
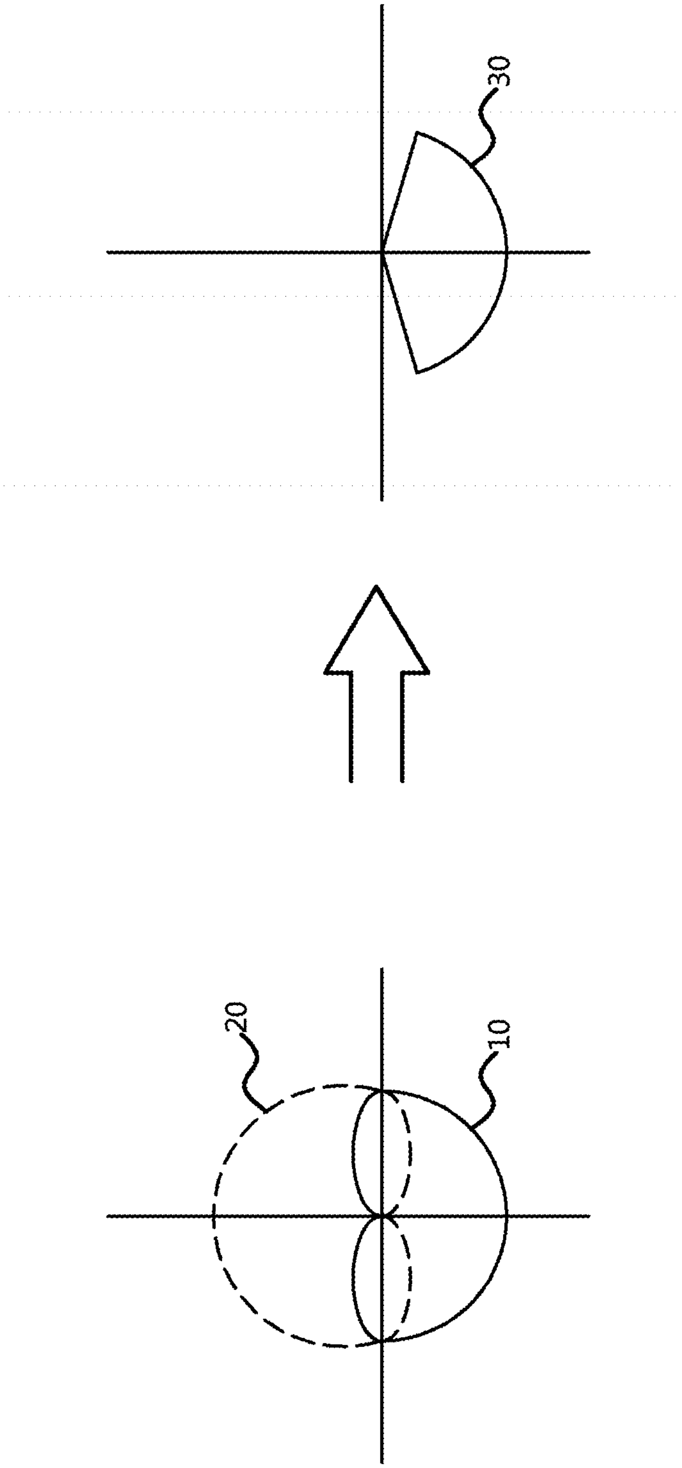
FIG. 3*a* and FIG. 3*b* are views of beam patterns illustrating the concept of the signal separation system using a directional microphone array according to an embodiment of the present invention.
Figure 3B:
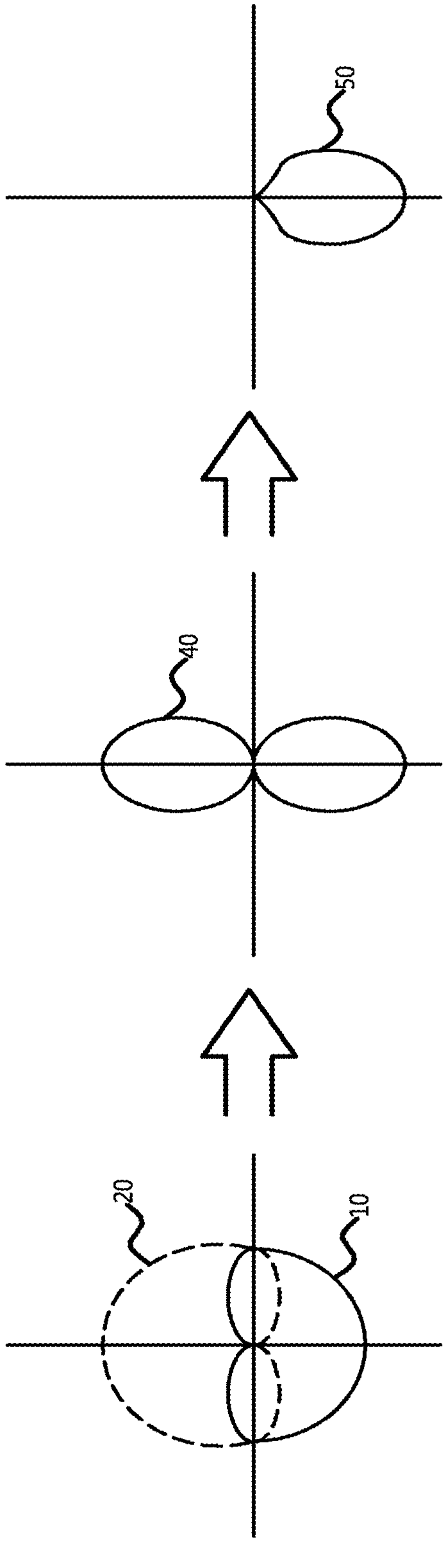

The first microphone 210 can be, for example, such that it faces forward with respect to the vertical surface of the microphone array 200. In addition, the second microphone (e.g. 220) can be disposed such that it is oriented opposite to the direction in which the first microphone 210 is disposed, i.e. rearward with respect to the end surface of the directional microphone array 200. Signals respectively received from the first microphone 210 and the second microphone (e.g. 220) can be transmitted to another device or system through a signal transmitting means 230 and 231 (such as a jack or signal lines). The microphone array 200 can generate a beam pattern 40, as shown in FIG. 3*b*.

Therefore, when a signal is received through the microphone array 200, a mixed signal in which a desired signal, i.e. a first audio signal, and an undesired signal, i.e. a second audio signal, can be inputted in the forward and rearward directions of the microphone array 200.

In other words, the mixed signal received through the first microphone 210 may contain an undesired second audio signal, and a signal received through the second microphone 220, i.e. a reference signal may also contain an undesired second audio signal. However, the level of the second audio signal contained in the reference signal received through the second microphone (e.g. 220) may be higher than the level of the second audio signal contained in the mixed signal received through the first microphone 210.

For instance, a sound source signal corresponding to the desired signal, i.e. the first audio signal, may be referred to as S1, and a sound source signal corresponding to the undesired signal, i.e. the second audio signal, may be referred to as S2.

Here, a signal $x_1(t)$ inputted through the first microphone 210 and a signal $x_2(t)$ inputted through the second microphone (e.g. 220) can be expressed as in Formula 1.

$$x_1(t)=a_{11}s_1(t)+a_{12}s_2(t)$$

$$x_2(t)=a_{21}s_1(t)+a_{22}s_2(t) \quad \text{[Formula 1]}$$

Here, $a_{11}$, $a_{12}$, $a_{21}$ and $a_{22}$ may indicate gain factors depending on the distances between the sound sources and the microphones.

Here, it is possible to assume a case in which the first sound source be present in the direction in which the first microphone 210 is oriented or a case in which most of the first audio signal outputted from the first sound source be inputted through the first microphone 210 and only a faint amount of the first audio signal be inputted through the second microphone (e.g. 220). That is, the level of the first audio signal contained in the signal received through the first microphone 210 can be higher than the level of the first audio signal contained in the signal received through the second microphone (e.g. 220).

In contrast, the undesired signal, i.e. the second audio signal, may be received mainly through the second microphone (e.g. 220). In this case, the level of the second audio signal contained in the signal received through the first microphone 210 may be lower than the level of the second audio signal contained in the signal received through the second microphone (e.g. 220).

In this case, there can be the following relationships: $a_{11}S_1(t) >> a_{21}S_1(t)$ and $a_{22}S_2(t) >> a_{12}S_2(t)$. Therefore, when signal separation is performed using the second microphone (e.g. 220), there is an effect in that a smaller amount of the level of the desired signal $s_1(t)$ is reduced while most of the level of the undesired signal $s_2(t)$ is reduced.

When a desired first audio signal is inputted mainly in a first direction and an undesired second audio signal is inputted mainly in a second direction, a signal separation system using directional microphone array according to the principle of the present invention can separate the desired first audio signal by cancelling the second audio signal using the above-described microphone array 200 in a simple fashion.

In a variety of cases, the first audio signal can be inputted mainly in the first direction, and the undesired second audio signal can be inputted mainly in the second direction. Such a case will be described with reference to FIG. 4*a* to FIG. 4*c*.

Figure 4A:
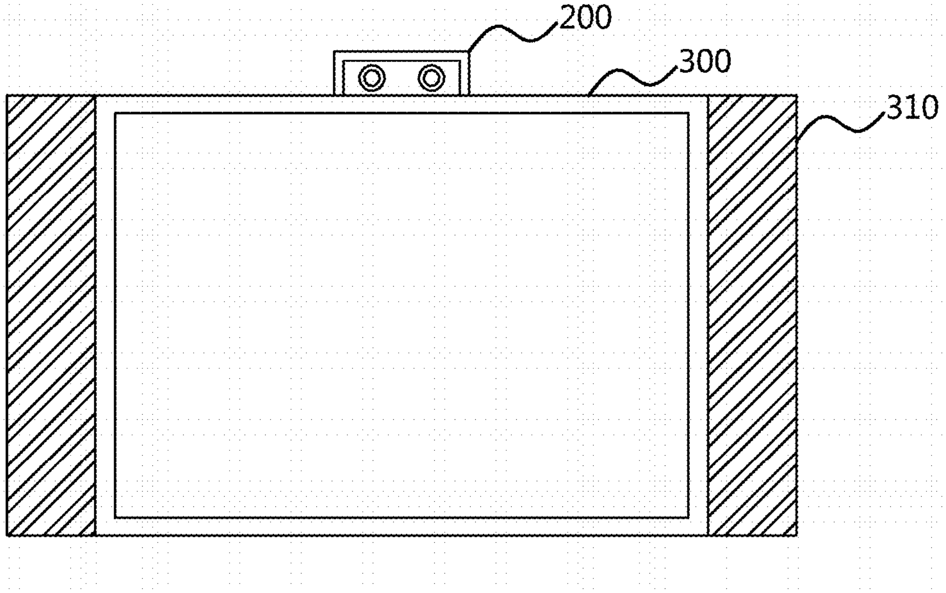
FIG. 4*a*, FIG. 4*b*, and FIG. 4*c* are views illustrating an audio-related system to which a signal separation system using a directional microphone array according to an embodiment of the present invention is applied.
Figure 4B:
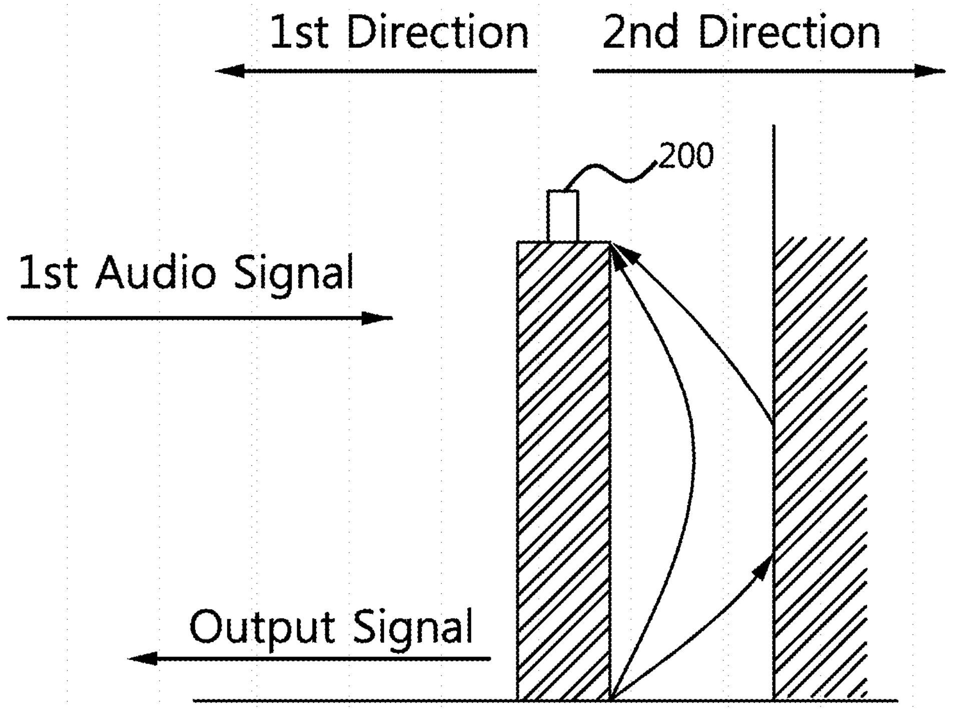
Figure 4C:
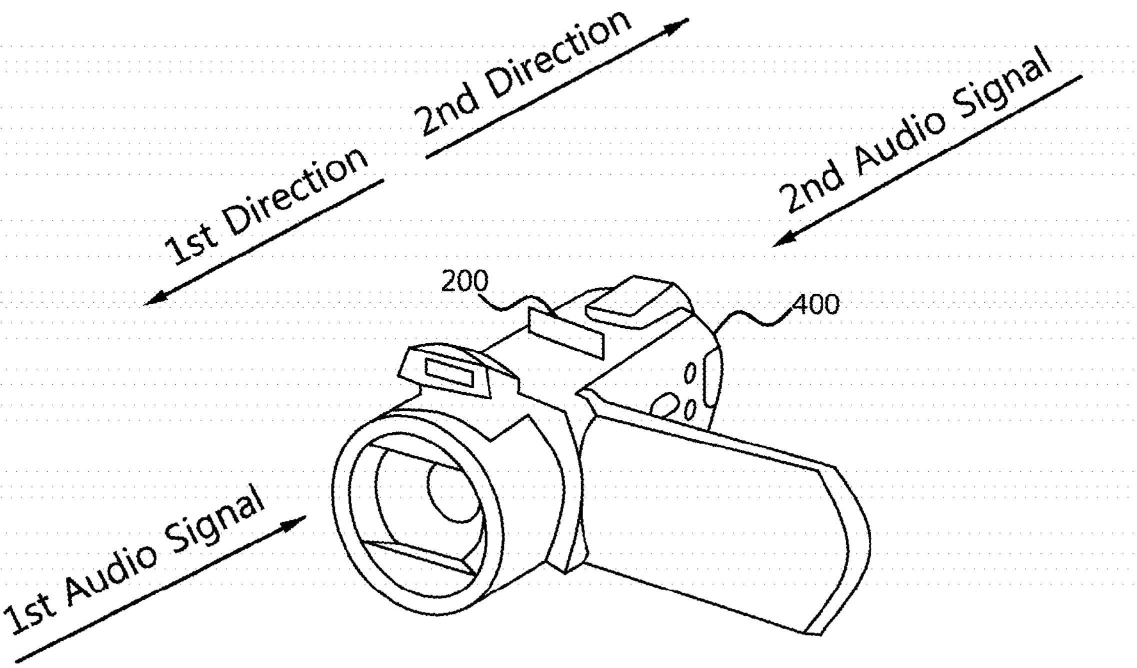
Figure 5A:
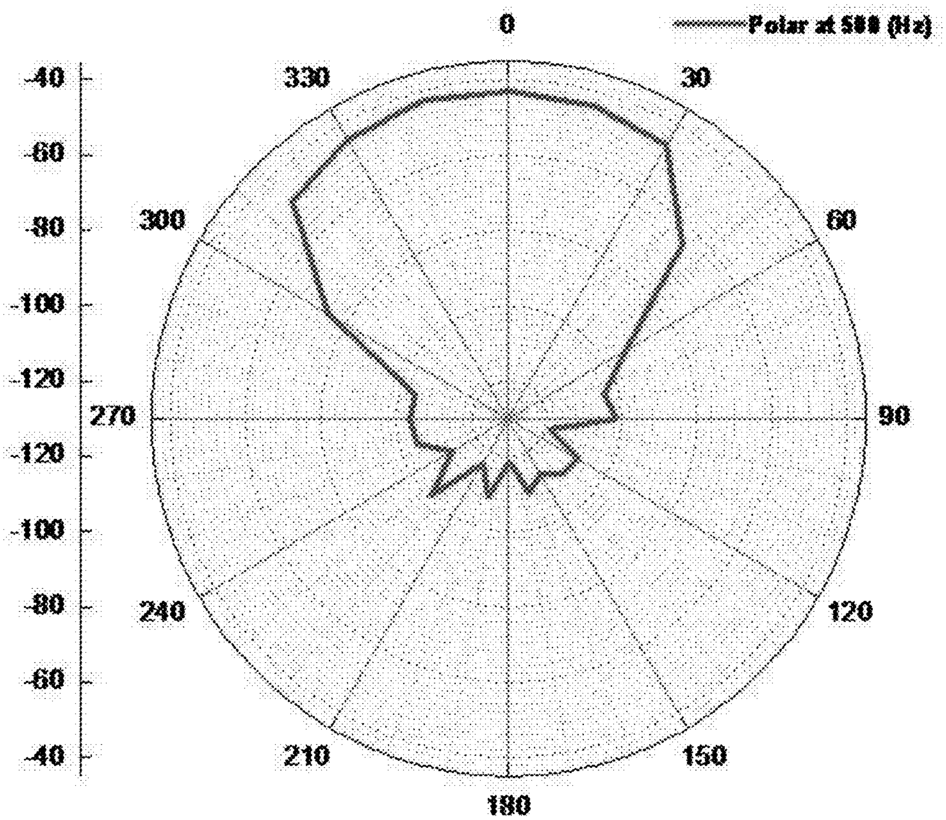
FIG. 5*a* to FIG. 5*d* are views showing simulation results of beam patterns produced by a method for providing a signal separation system using a directional microphone array according to an embodiment of the present invention.
Figure 5B:
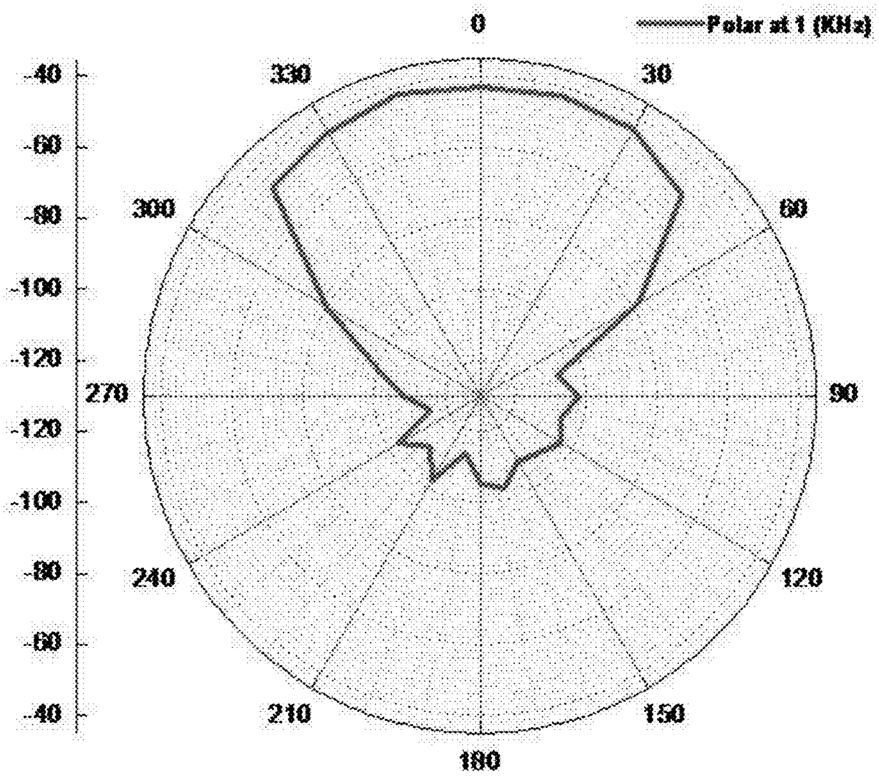
Figure 5C:
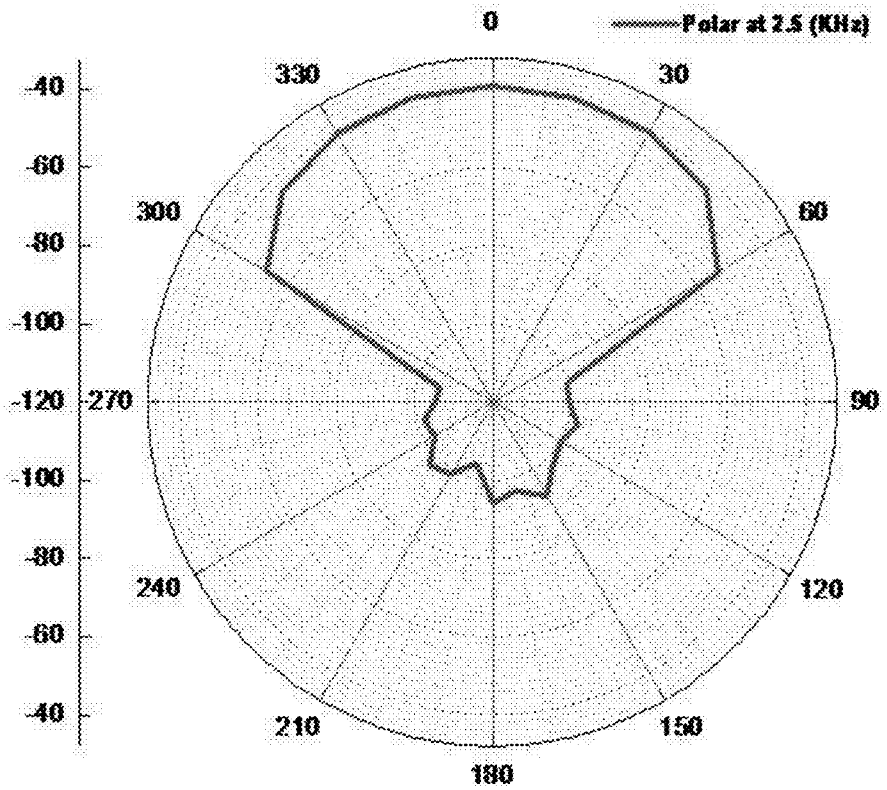
Figure 5D:
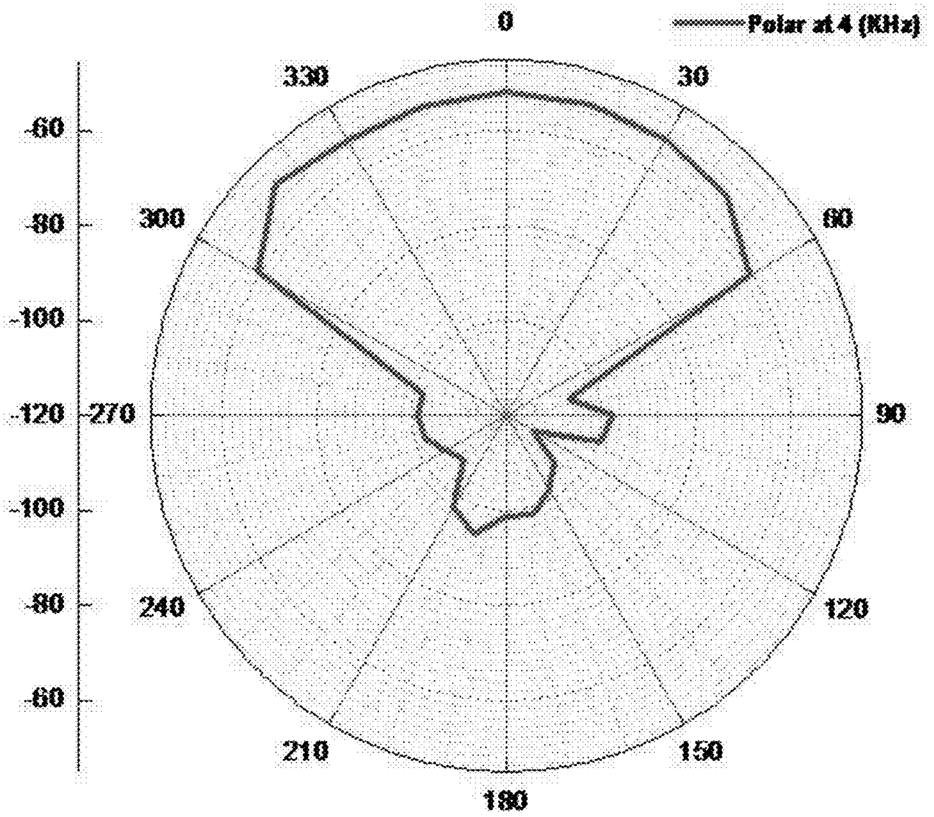

FIG. 4*a* to FIG. 4*c* are views illustrating an audio-related system to which the signal separation system using a directional microphone array according to an embodiment of the present invention is applied.

First, referring to FIG. 4*a*, an audio output system 300 (such as an IPTV, a set-top box, a telephone or a computer) can be provided. The audio output system 300 can produce and output an audio. For this, the audio output system 300 can include an audio output device 310 (such as a speaker). In addition, the audio output system 300 may receive an audio signal from the outside. For this, the microphone array 200 according to an embodiment of the present invention can be connected to the audio output system 300. The directional microphone array 200 can be disposed at a position (e.g. the upper end) of the audio output system 300, as shown in FIG. 4*a*, but is not limited thereto.

The audio output device 310 which is generally provided in the audio output system 300 can be disposed in the direction toward a user who uses the audio output system 300, i.e. a first direction (e.g., in the forward direction from the paper surface of FIG. 4*a*). In addition, the audio output device 310 may be disposed on a side surface of the audio output system 300, or in some embodiments, on a rear surface of the audio output system 300.

A signal (e.g. an audio command or a conversation audio) that is desirable to the audio output system 300 may be sent as an outputted from a user. Here, the user may be positioned in the first direction.

Therefore, a desired signal, i.e. a first audio signal, can be received mainly through the first microphone 210 which is oriented in the first direction. A second audio signal, i.e. an echo signal caused by a signal outputted from the audio output device 310, can be received mainly through the second microphone (e.g. 220).

For instance, FIG. 4*b* is a view showing a side surface of the audio output system 300 shown in FIG. 4*a*. As shown in FIG. 4*b*, when an output signal is outputted by the audio output device 310 of the audio output system 300, an echo signal caused by the output signal is received mainly through the second microphone (e.g. 220) which is positioned opposite to the first direction, rather than the first microphone 210 which is oriented in the first direction. In particular, when an obstacle such as a wall is positioned adjacent to the second direction of the audio output system 300, it is more likely that the level of the echo signal, i.e. the second audio signal, received through the second microphone (e.g. 220) be higher than the level of the second audio signal received through the first microphone 210.

Therefore, when the second audio signal is canceled from the mixed signal received through the directional microphone array 200 using the echo signal received through the second microphone (e.g. 220) as a reference signal as described above, it is possible to more effectively separate the first audio signal from the mixed signal.

In addition, in the related art, when the audio output system 300 outputs a signal, the signal outputted through the audio output device 310 was used as a reference signal in order to cancel an echo signal from an input mixed signal. That is, according to the previously filed application or a variety of conventional methods of canceling an echo signal, the output signal outputted through the audio output device 310 was stored, and the echo signal was canceled using the stored signal. For instance, the previously filed application or the conventional methods performed the process of estimating the echo signal through channel estimation, gain factor calculation and the like using the stored signal, and then canceling the echo signal from the mixed signal.

In contrast, according to the technical concept of the present invention, a signal outputted from the audio output system 300 is not used as a reference signal. In contrast, a signal, which channel and gain factors are actually applied, received through the second microphone (e.g. 220) is used as the reference signal. Consequently, calculation for the signal separation process can be fast and efficient. In addition, in the related art, the audio output system 300 has the following problems, hardware and/or software resources for signal separation, such as a means for storing the output signal or a means for transmitting the stored signal to a signal separation device (echo canceller), must be previously provided or modification of an existing structure is required. In contrast, the present invention has an effect in that the technical concept of the present invention can be embodied simply when the directional microphone array 200 is connected to an audio input terminal of the audio output system 300 and the signal separation system for separating signals, i.e. a preset software or application, is installed. In some embodiments, the signal separation system can be provided integrally with the microphone array 200 without being installed in the audio output system 300. In this case, when the signal separation system using directional microphone array, i.e. the microphone array 200 according to an embodiment of the present invention, is connected to the audio output system 300, the audio output system 300 may selectively receive a desired input, i.e. a desired signal in which a second audio signal is canceled from a mixed signal. Of course, in this case, the signal separation system using directional microphone array according to an embodiment of the present invention may be required to include a processing device having calculation ability. Of course, it is also possible that the signal separation system using directional microphone array according to an embodiment of the present invention be installed inside the audio output system 300 at the time of the manufacture of the audio output system.

In a method for providing the signal separation system using a directional microphone array according to an embodiment of the present invention, the undesired signal may not be the echo signal illustrated in FIG. 4*a* and FIG. 4*b*. This case will be described with reference to FIG. 4*c*.

FIG. 4*c* shows an example in which the technical concept of the present invention is applied to an audio receiving system 400 (such as a camcorder or an audio recorder). The audio receiving system 400 is referred to as including all systems that can receive and/or store audio. Of course, in some embodiments, the audio receiving system 400 can further receive image signals as a camcorder.

The microphone array 200 according to an embodiment of the present invention can be connected to or previously installed in the audio receiving system 400. The first microphone 210 in the microphone array 200 can be installed or manipulated so as to be oriented in a direction corresponding to the first audio signal that the audio receiving system 400 is intended to receive. Taking a camcorder by way of example, the first microphone 210 in the microphone array 200 can be disposed in the direction of a lens, i.e. a first direction. Then, the first microphone 210 can be oriented in the direction toward a target, images of which a user (photographer) intends to take, i.e. the first direction.

The target can output a first sound source signal, and a first audio signal based on the first sound source signal can be received mainly through the first microphone 210. In the meantime, a signal that the audio receiving system 400 is not intended to receive, i.e. a second audio signal, can be inputted mainly from a second direction. For instance, the second audio signal can be noise created by the user, unnecessary sound, or the like. Since the audio receiving system 400 can be manipulated to be oriented in the direction toward the subject, various types of sound that are received mainly in the opposite direction may be undesired sound. Accordingly, the technical concept of the present invention can also be usefully applied to this audio receiving system 400. That is, the first audio signal can be separated through the process in which the second audio signal is canceled from the mixed signal received through the microphone array 200. The separated signal can be stored in the audio receiving system 400 or transmitted to other systems.

Figure 2A:
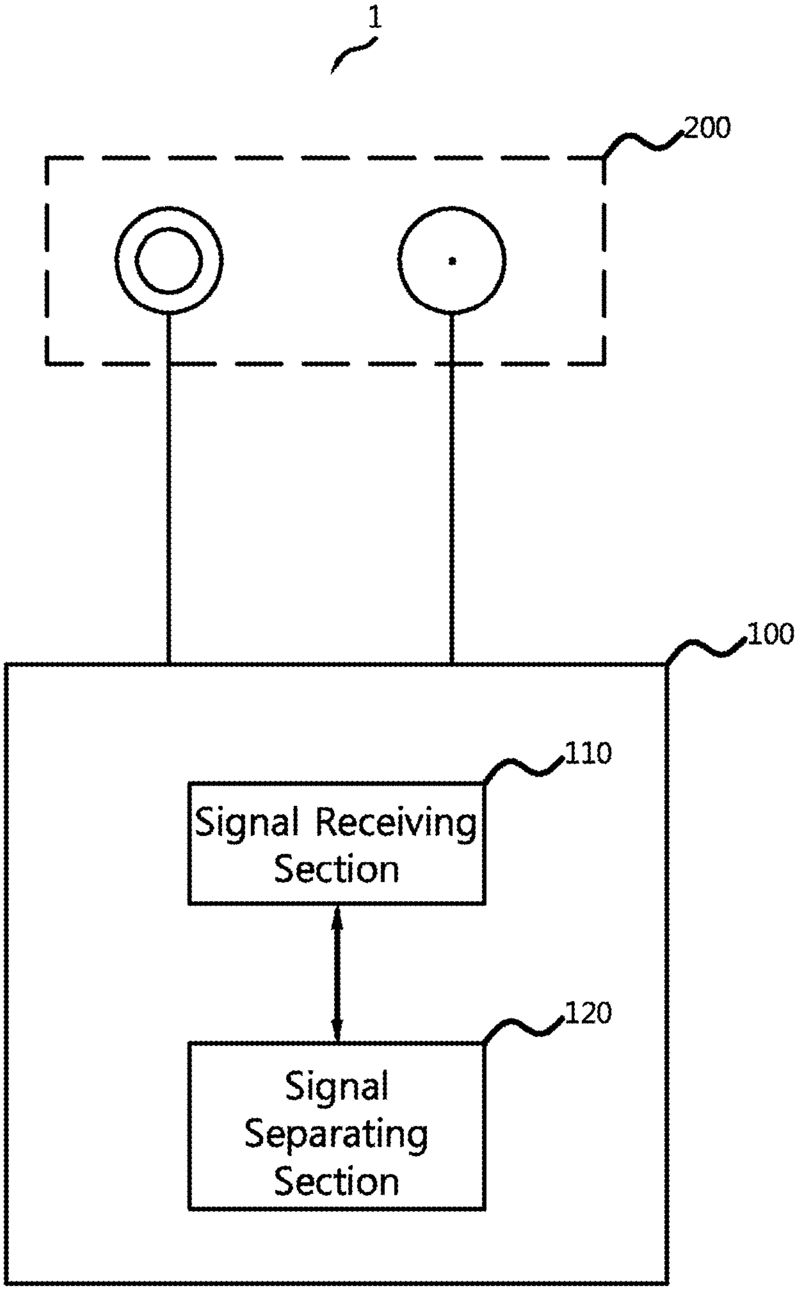
FIG. 2*a* and FIG. 2*b* are views showing the schematic configuration of a signal separation system using a directional microphone array according to an embodiment of the present invention.
Figure 2B:
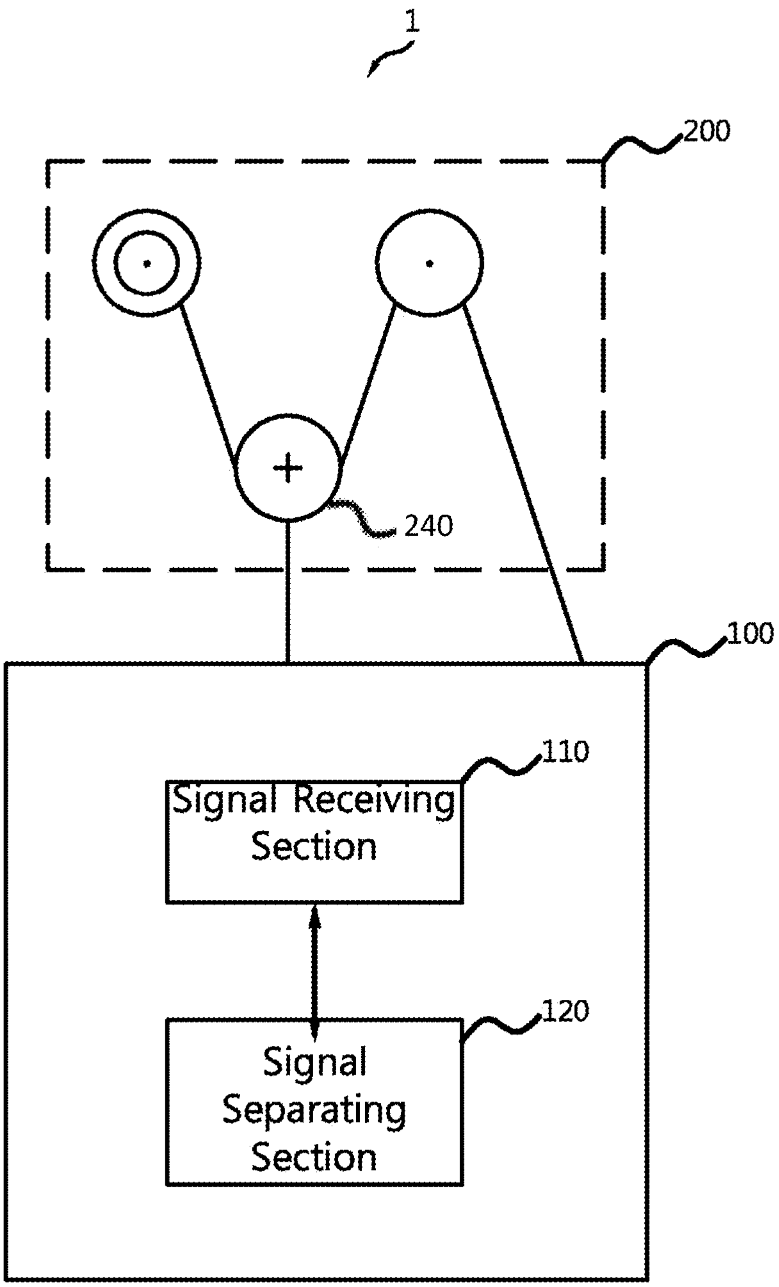

FIG. 2*a* and FIG. 2*b* show the schematic configuration of the signal separation system using a directional microphone array according to an embodiment of the present invention which can realize this technical concept. In addition, FIG. 3*a* and FIG. 3*b* schematically show a beam pattern that the signal separation system using a directional microphone array shown in FIG. 2*a* and FIG. 2*b* can produce.

First, referring to FIG. 2*a*, a signal separation system using directional microphone array 1 according to an embodiment of the present invention can include a signal separation system 100. The signal separation system using directional microphone array 1 can further include a microphone array 200. The signal separation system 100 can receive a mixed signal from the microphone array 200. In addition, the signal separation system 100 can receive a reference signal. The reference signal can be received through at least one second microphone (e.g. 220). The mixed signal can be received through at least one first microphone (e.g. 210).

Then, the signal separation system can perform the function of canceling the reference signal from the mixed signal. The signal separation system 100 can include a signal receiving section 110 and a signal separating section 120. The signal receiving section 110 can receive the mixed signal and the reference signal from the microphone array 200 and send the received signals to the signal separating section 120. Then, the signal separating section 120 can cancel the reference signal from the mixed signal. The signal separating section can cancel the reference signal from the mixed signal in a variety of methods. That is, it is possible to apply any technical concept (e.g. independent component analysis, major component analysis, signal suppression, or the like) with which one known signal (the reference signal) can be canceled from another known signal (the mixed signal).

The signal separating section 120 according to an embodiment of the present invention can cancel the reference signal from the mixed signal using a BSS algorithm. Here, the signal separation system 100 can separate the reference signal from the mixed signal more efficiently than the conventional BSS algorithm. This is because the one signal to be separated, i.e. the reference signal received through the second microphone (e.g. 220), is known according to an embodiment of the present invention, whereas the conventional BSS algorithm separates n number of unknown signals when the n number of unknown signals has been received through an n number of microphones. The technical concept that can be applied to this case was specifically disclosed in the previously filed application. Therefore, in brief, a first sound source S1 corresponding to the desired signal, i.e. the first audio signal, and a second sound source S2 corresponding to the undesired second audio signal can be present. Then, a sound source signal from the first sound source S1 can be referred to as $s_1(t)$, and a sound source signal from the second sound source S2 can be referred to as $s_2(t)$. In addition, a signal received through the first microphone 210 (i.e. a mixed signal) can be referred to as $x_1(t)$, and a signal received through the second microphone (e.g. 220), i.e. a reference signal, can be referred to as $x_2(t)$.

Then, it is possible to perform the BSS algorithm in a similar fashion to that of the previously filed application by setting the first sound source signal as a first BSS sound source signal, the second sound source signal corresponding to the second audio signal as a second BSS sound source signal, the signal inputted through the at least one first microphone as a first BSS input signal, and the reference signal as a second BSS input signal.

In this case, in a gain factor matrix $$\begin{pmatrix} a_{11} & a_{12} \\ a_{21} & a_{22} \end{pmatrix}$$

according to Formula 12 the previously filed application, $a_{21}$ was set 0, and $a_{11}$ and $a_{22}$ were set 1. In contrast, in an assumption according to the technical concept of the present invention, calculation can be performed by setting $a_{11}$ and $a_{22}$ to be 1 when the calculation ability is sufficient. In another embodiment, it is possible to set $a_{11}$ and $a_{22}$ to be 1 and $a_{11}$ to be 0 or set $a_{11}$ and $a_{22}$ to be 1 and $a_2$ to be 0.

In addition, it is possible to increase the offset ratio of the $S_2$ signal component by performing signal suppression using respective matrix result values.

A person skilled in the art to which the present invention relates can understand that the reference signal can be canceled from the received mixed signal in a variety of other methods.

Turning to FIG. 2*b*, unlike that shown in FIG. 2*a*, a mixed signal received through the signal receiving section 110 can be a signal in which a signal received through the first microphone 210 and a signal received through the second microphone 220 are mixed, i.e. a signal received through the entire microphone array 200. For this, a mixing means 240 can be further provided. The mixing means 240 can be embodied such that it is included in the microphone array 200 or the signal receiving section 110. The mixing means 240 can be implemented as a simple hardware structure (e.g. an interconnection of signal lines). Also in this fashion, the technical concept of the present invention can exhibit superior performance when canceling the signal received through the second microphone (e.g. 220) from the signal in which the signal received through the first microphone 210 and the signal received through the second microphone (e.g. 220) are mixed. This can be described as follows using beam patterns.

FIG. 3*a* shows the case in which a signal received through the first microphone 210 is used as a mixed signal as in FIG. 2*a*. Here, a beam pattern 10 produced by the first microphone 210 is as shown in FIG. 3*a*. In addition, a beam pattern 20 produced by the second microphone (e.g. 220) can have a cardioid shape oriented opposite to the direction of the beam pattern 10. Therefore, when the beam pattern 20 is canceled from the beam pattern 10, a beam pattern 30 can be produced in a desired direction (a first direction).

Turning to FIG. 3*b*, as in FIG. 2*b*, a signal in which a signal received through a first microphone 210 and a signal received through the second microphone (e.g. 220) are mixed is used as a mixed signal. As shown in FIG. 3*b*, beam patterns produced by the first microphone 210 and the second microphones (e.g. 220) can be a beam pattern 10 and a beam pattern 20. Therefore, when the two beam patterns 10 and 20 are combined, a beam pattern 40 shown in FIG. 3*b* can be formed.

Under any circumstances, the signal separation system using directional microphone array 1 according to an embodiment of the present invention can selectively produce the beam pattern 30, 50 in the first direction in an easy way using the microphone array 200 according to an embodiment of the present invention. Therefore, the embodiments shown in FIG. 2*a* and FIG. 2*b* can be selectively applied depending on the type of an audio-related system and the environment to which the signal separation system 1 using a directional microphone array according to an embodiment of the present invention is applied.

The beam patterns shown in FIG. 3*a* and FIG. 3*b* are merely illustrative of beam patterns that are theoretically or conceptually produced, and the shape of a beam pattern that is actually produced may vary depending on the environment.

Test simulation results of beam patterns according to the technical concept of the present invention are shown in FIG. 5*a* to FIG. 5*d*.

FIG. 5*a* to FIG. 5*d* are views showing simulation results of beam patterns produced in a method for providing a signal separation system using a directional microphone array according to an embodiment of the present invention. Here, FIG. 5*a* to FIG. 5*d* are views showing frequency-specific polar patterns of the simulation results carried out in a silent room by fixing the signal separation system using directional microphone array 1 according to an embodiment of the present invention on a turntable and then rotating the turntable from 0 to 360° by 15°. The simulation results exhibit beam patterns produced from audio signals at 500 Hz, 1 KHz, 2.5 KHz and 4 KHz bands. Here, the y axis indicates the level of signals (db).

As shown in FIG. 5*a* to FIG. 5*d*, in the signals in various frequency bands separated by the signal separation system using directional microphone array 1, it is apparent that the level of a signal received in the first direction is significantly higher than the level of a signal received in the second direction. That is, it can be appreciated that high performance over the related art can be obtained since the signal sensitivity at the rearward side is lower than the signal sensitivity at the forward side by 40 db or more.

Returning to FIG. 2*a* and FIG. 2*b*, the microphone array 200 and the signal separation system 100 of the signal separation system using directional microphone array 1 according to an embodiment of the present invention can be configured integral with housing. Then, the signal separation system using directional microphone array 1 can output a signal separated by the signal separation system 100 to the audio output system 300 or the audio receiving system 400. In this case, the signal separation system using directional microphone array 1 can, of course, further include a data processing unit.

In another embodiment, the microphone array 200 is connected to the audio output system 300 or the audio receiving system 400 via a jack or the like, and the signal separation system 100 can be included in the audio output system 300 or the audio receiving system 400. In this case, the mixed signal or the reference signal outputted through the microphone array 200 can be transmitted to the signal separation system 100 directly or via a preset route. The signal separation system 100 can be implemented as a piece of software and systematically combined with a piece of hardware provided in the audio output system 300 or the audio receiving system 400.

The providing method for signal separation system using directional microphone array according to an embodiment of the present invention can be embodied as computer readable codes that are stored in a computer readable recording medium. The computer readable recording medium includes all sorts of record devices in which data that are readable by a computer system are stored. Examples of the computer readable recording medium include read only memory (ROM), random access memory (RAM), compact disc read only memory (CD-ROM), a magnetic tape, a hard disc, a floppy disc, an optical data storage device and the like. Further, the recording medium may be implemented in the form of a carrier wave (e.g. Internet transmission). In addition, the computer readable recording medium may be distributed to computer systems on the network, in which the computer readable codes are stored and executed in a decentralized fashion. In addition, functional programs, codes and code segments for embodying the present invention can be easily construed by programmers having ordinary skill in the art to which the present invention pertains.

While the present invention has been described with reference to the certain exemplary embodiments shown in the drawings, it will be understood by a person skilled in the art that various modifications and equivalent other embodiments may be made therefrom. Therefore, the true scope of the present invention shall be defined by the concept of the appended claims.

INDUSTRIAL APPLICABILITY

The present invention can be applied to a variety of systems which is required to separate a desired audio signal from an undesired audio signal.

The invention claimed is:

1. A signal separation system using a directional microphone array comprising:

a signal receiving section configured to receive a mixed signal in which a first audio signal and a second audio signal are mixed using a microphone array, the microphone array comprising at least one first microphone oriented in a first direction and at least one second microphone oriented in a second direction different from the first direction, and receives a reference signal through the at least one second microphone, wherein the at least one first microphone is configured to form a first beam pattern in the first direction, and the at least one second microphone is configured to form a second beam pattern in the second direction;

an audio signal separating section configured to cancel the second audio signal from the mixed signal received by the signal receiving section, wherein the audio signal separating section is configured to cancel the second audio signal based on the reference signal inputted through the at least one second microphone, wherein the signal separating section is configured to perform blind source separation (BSS) by setting a first sound source signal corresponding to the first audio signal as a first BSS sound source signal, a second sound source signal corresponding to the second audio signal as a second BSS sound source signal, a signal received through the at least one first microphone as a first BSS input signal, and the reference signal as a second BSS input signal.

2. The signal separation system using a directional microphone array according to claim 1, wherein the mixed signal comprises a signal received through the at least one first microphone, or, a signal in which the signal received through the at least one first microphone and a signal received through the at least one second microphone are mixed.

3. The signal separation system using a directional microphone array according to claim 1, wherein the signal separation system is included in an audio output system.

4. The signal separation system using a directional microphone array according to claim 1, wherein the signal separation system is included in an audio output system, and the second audio signal comprises an echo signal which is an audio signal outputted from the audio output system and inputted through the microphone array.

5. The signal separation system using a directional microphone array according to claim 1, wherein the second direction is opposite to the first direction.

6. The signal separation system using a directional microphone array according to claim 1, wherein the signal separation system is included in an audio storage system, the first audio signal comprises a target audio signal that is to be outputted from a first sound source positioned in the first direction with respect to the audio storage system and be stored in the audio storage system, and the second audio signal comprises a signal that is to be outputted from a second sound source positioned in the second direction opposite to the first direction with respect to the audio storage system and be removed from the mixed signal.

7. A method of signal-separating using a signal separation system having a directional microphone array, the method comprising:

receiving, at the signal separation system, a mixed signal in which a first audio signal and a second audio signal are mixed through a microphone array, wherein the microphone array comprises at least one first microphone oriented in a first direction and at least one second microphone oriented in a second direction different from the first direction, and wherein the at least one first microphone is configured to form a first beam pattern in the first direction, and the at least one second microphone is configured to form a second beam pattern in the second direction;

receiving, at the signal separation system, a reference signal through the at least one second microphone of the microphone array; and canceling, at the signal separation system, the second audio signal from the mixed signal, wherein the canceling of the second audio signal from the mixed signal comprises canceling the second audio signal based on the reference signal, wherein the canceling comprises performing blind source separation (BSS) by setting a first sound source signal corresponding to the first audio signal as a first BSS sound source signal, a second sound source signal corresponding to the second audio signal as a second BSS sound source signal, a signal received through the at least one first microphone as a first BSS input signal, and the reference signal as a second BSS input signal.

8. The method according to claim 7, wherein the mixed signal comprises a signal received through the at least one first microphone or a signal in which the signal received through the at least one first microphone and a signal received through the at least one second microphone are mixed.

9. A non-transitory computer readable recording medium in which a program for executing the method recited in claim 7 is recorded.

10. A non-transitory computer readable recording medium in which a program for executing the method recited in claim 8 is recorded.

* * * * *